US011190495B2

(12) United States Patent
Jaroch

(10) Patent No.: US 11,190,495 B2
(45) Date of Patent: Nov. 30, 2021

(54) ONE-TIME-PAD ENCRYPTION

(71) Applicant: Colossio, Inc., Chicago, IL (US)

(72) Inventor: Joseph A. Jaroch, Chicago, IL (US)

(73) Assignee: Colossio, Inc., Chicago, IL (US)

( * ) Notice: Subject to any disclaimer, the term of this patent is extended or adjusted under 35 U.S.C. 154(b) by 85 days.

(21) Appl. No.: 15/722,663

(22) Filed: Oct. 2, 2017

(65) Prior Publication Data

US 2019/0104114 A1 Apr. 4, 2019

(51) Int. Cl.
| | |
|---|---|
| *G06F 21/00* | (2013.01) |
| *H04L 29/06* | (2006.01) |
| *H04L 9/06* | (2006.01) |
| *G06F 7/58* | (2006.01) |
| *H04L 9/12* | (2006.01) |
| *H04W 4/80* | (2018.01) |
| *H04L 9/08* | (2006.01) |
| *H04L 9/32* | (2006.01) |
| *G06F 21/36* | (2013.01) |
| *H04W 12/00* | (2021.01) |
| *G06F 21/60* | (2013.01) |

(52) U.S. Cl.
CPC .......... *H04L 63/0428* (2013.01); *G06F 7/588* (2013.01); *G06F 21/36* (2013.01); *H04L 9/0656* (2013.01); *H04L 9/0894* (2013.01); *H04L 9/12* (2013.01); *H04L 9/3234* (2013.01); *H04L 9/3239* (2013.01); *H04L 9/3297* (2013.01); *H04L 63/061* (2013.01); *H04L 63/067* (2013.01); *H04L 63/18* (2013.01); *H04W 4/80* (2018.02); *H04W 12/00* (2013.01); *G06F 21/602* (2013.01); *H04L 2209/805* (2013.01); *H04L 2463/081* (2013.01)

(58) Field of Classification Search
CPC ..... H04L 63/0428; H04L 9/0656; H04L 9/12; H04W 4/80; G06F 7/588; G06F 21/602
See application file for complete search history.

(56) References Cited

U.S. PATENT DOCUMENTS

| | | | | |
|---|---|---|---|---|
| 2007/0150415 | A1* | 6/2007 | Bundy | H04L 9/0866 705/51 |
| 2010/0088522 | A1* | 4/2010 | Barrus | G06F 21/64 713/181 |
| 2012/0246006 | A1* | 9/2012 | Levi | G06Q 30/02 705/14.64 |
| 2013/0246280 | A1* | 9/2013 | Kirsch | G06Q 20/14 705/71 |
| 2016/0119301 | A1* | 4/2016 | Thilgen | H04L 63/06 726/1 |
| 2016/0321654 | A1* | 11/2016 | Lesavich | G06F 21/6245 |

(Continued)

*Primary Examiner* — Kendall Dolly
*Assistant Examiner* — Michael M Lee
(74) *Attorney, Agent, or Firm* — Barnes & Thornburg LLP

(57) ABSTRACT

Methods for secure communications using one-time pad encryption are provided. In one aspect, a method includes generating and sharing, via proximity inter-device communication, unique device codes on each of multiple devices to be paired or grouped together, intermixing the device codes to generate a one-time pad code, generating a random block of data based on the one-time pad code, persisting the one-time pad code and random block of data over each device, and encrypting/decrypting messages between the paired or grouped devices. Systems and machine-readable media are also provided.

18 Claims, 6 Drawing Sheets

(56) References Cited

U.S. PATENT DOCUMENTS

| | | | |
|---|---|---|---|
| 2017/0006026 A1* | 1/2017 | An | H04L 63/10 |
| 2017/0033925 A1* | 2/2017 | DeNeut | G06F 21/00 |
| 2017/0124303 A1* | 5/2017 | Baldwin | G06F 21/10 |
| 2018/0015218 A1* | 1/2018 | Welsch | A61M 5/172 |
| 2018/0048945 A1* | 2/2018 | Al Mohizea | H04N 1/00244 |
| 2018/0063126 A1* | 3/2018 | Karapantelakis | H04L 63/0853 |
| 2019/0066079 A1* | 2/2019 | Liu | G06Q 20/208 |
| 2019/0097796 A1* | 3/2019 | Wang | G06F 21/35 |

\* cited by examiner

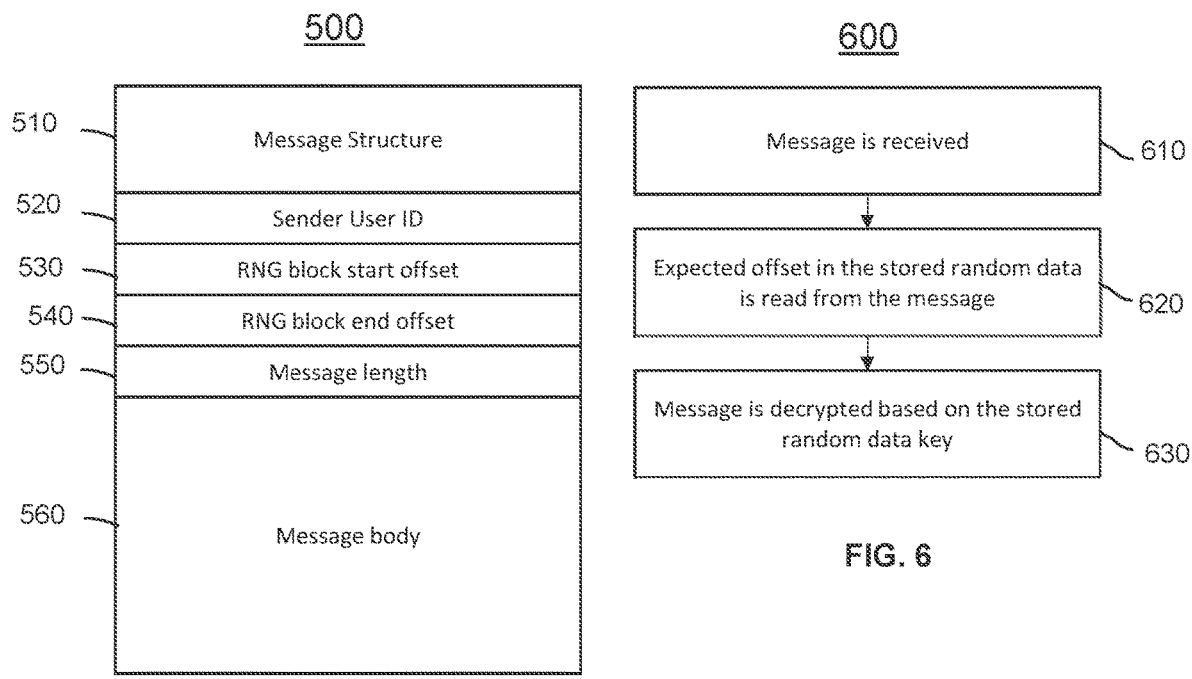

ONE-TIME-PAD ENCRYPTION

TECHNICAL FIELD

The present disclosure generally relates to encryption, and more specifically relates to systems and methods for providing secure communication between devices via one-time-pad encryption.

BACKGROUND

Encryption is a critical attribute of our modern world, allowing data to be stored safely, reducing the potential of it to be compromised by an attacker. Conventional encryption generally begins with the exchange of a key (a passphrase or cryptographic function), shared between two parties, which allows each party to decrypt the data sent by the other. However, the exchange of this key represents an opportunity for an attacker to intercept the key and decrypt subsequently exchanged data. Emerging research is attempting to use quantum computing to exchange keys but the hardware and physics behind this approach are currently poorly understood and will be unlikely to be able to be retrofitted to existing devices.

A "one-time-pad" is known to be the only truly unbreakable encryption, using a key of an equivalent length to the data itself to encrypt the data, and using the key only once. However, current one-time-pad implementations still require the one-time-pad to be transmitted in some manner which can be intercepted (over the internet, sent by physical mail, over a phone line, etc.), opening an identical window to compromise communication if just a conventional key was used. It is desired to provide a truly secure one-time-pad transmission and subsequent persistent use in continued conversations between devices.

The description provided in the background section should not be assumed to be prior art merely because it is mentioned in or associated with the background section. The background section may include information that describes one or more aspects of the subject technology.

SUMMARY

According to certain aspects of the present disclosure, methods and systems for generating a one-time-pad simultaneously on two or more independent devices by using images shown on screen which contain random data displayed on one device and recorded by the other devices are provided. According to certain aspects of the present disclosure, methods and systems for persisting a one-time-pad on the device alongside generated random data are provided. According to certain aspects of the present disclosure, methods and systems for using the persisted one-time-pad to encrypt and decrypt data, referencing positional markers and rolling checksums within the one-time-pad to allow the pad to be reused across many transactions by modifying the persisted data and preventing the entire pad from being used in any single transaction are provided.

In one or more embodiments, a computer-implemented method for providing secure communications between devices includes generating, by a first device, a first random number and formatting, by the first device, the first random number into a first device code. The method also includes providing, by the first device, the first device code for transmission to a second device and receiving, by the second device, the first device code from the first device via a proximity inter-device communication. The method further includes generating, by the second device, a second random number and providing, by the second device, the second device code for transmission to the first device. The method also includes providing, by the second device, the second device code for transmission to the first device and receiving, by the first device, the second device code from the second device via the proximity inter-device communication. The method further includes generating and storing a one-time pad code on each of the first and second devices, wherein the first and second devices are paired via the one-time pad code.

In one or more embodiments, a system for providing secure communications between a plurality of devices includes a memory and a processor configured to execute instructions. The executed instructions cause the processor to, for each of the plurality of devices, generate a unique device code associated with that device; transmit, via proximity inter-device communication, the unique device code to each of the other of the plurality of devices; receive, via proximity inter-device communication, the other unique device codes from each of the other of the plurality of devices; generate a one-time pad code by intermixing all of the unique device codes using a scrambler; and store the one-time pad code on each of the plurality of devices.

In one or more embodiments, a non-transitory machine-readable storage medium comprising machine-readable instructions causes a processor to execute a method for providing secure communication using a one-time pad. The method includes generating, by a computerized device, a random number and formatting, by the computerized device, the random number into a device code unique to the computerized device. The method also includes receiving, by the computerized device via a proximity inter-device communication, other device codes uniquely associated with one or more other computerized devices and generating a one-time pad code by intermixing all of the device codes. The method further includes generating, by a cryptographically secure random number generator, a block of random data based on the one-time pad code and persisting the one-time pad code and the block of random data on the computerized device. The method also includes encrypting messages for transmission to any of the other computerized devices using the persisted one-time pad code and block of random data and decrypting messages received from any of the other computerized devices using the persisted one-time pad code and block of random data.

It is understood that other configurations of the subject technology will become readily apparent to those skilled in the art from the following detailed description, wherein various configurations of the subject technology are shown and described by way of illustration. As will be realized, the subject technology is capable of other and different configurations, and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 5 is an example message structure associated with the disclosure of FIG. 2.

FIG. 6 is an example process associated with the disclosure of FIG. 2.

Figure 1:
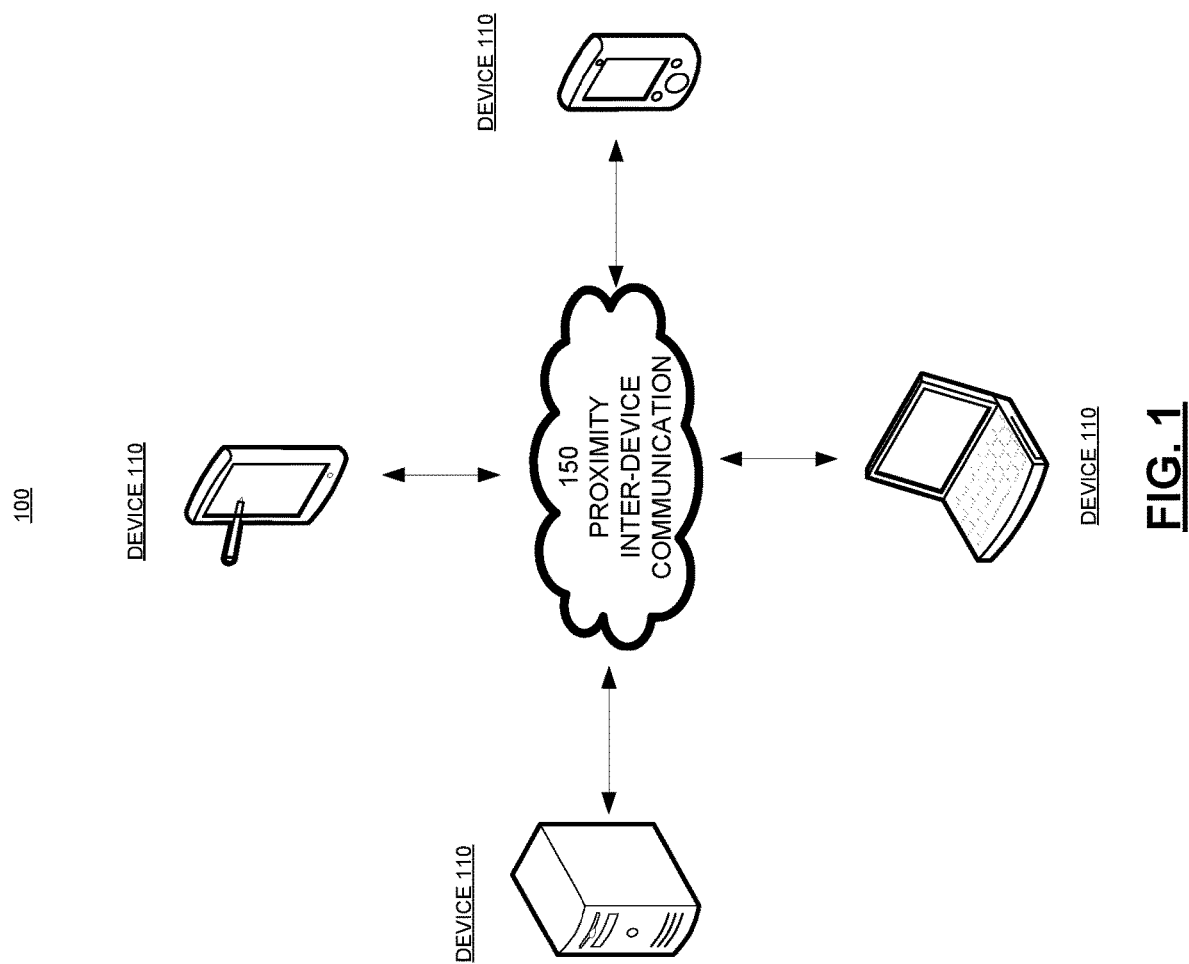
FIG. 1 illustrates an example architecture for providing one-time-pad encryption between devices.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

In one or more embodiments, a method is provided for generating a one-time-pad simultaneously on two or more independent devices by using images shown on screen which contain random data, displayed on one device and recorded by the other device(s). In one or more embodiments, a method is provided for persisting the one-time-pad on the device alongside generated random data. In one or more embodiments, a method is provided for using the persisted one-time-pad to encrypt and decrypt data, referencing positional markers and rolling checksums within the one-time-pad to allow the pad to be reused across many transactions by modifying the persisted data and preventing the entire pad from being used in any single transaction.

The subject technology may be implemented entirely in a one-time-pad application (app) for mobile devices (e.g., smartphones, tablet computers, laptop computers) via any mobile device operating system. The subject technology may be based on device access to a communication protocol such as near field communication (NFC) and/or the camera of the device. Images displayed on the screen of a first device may be captured by the same app installed on a second (e.g., receiving) device.

The subject technology may be embedded inside other communication applications and/or a communication application may be implemented within the one-time-pad app itself. The communication between devices may occur through any data format (e.g., text, video, audio). For example, communication by text may be the most common approach.

When the one-time-pad application is embedded in a third party communication application, the third party communication application may invoke the one-time-pad app to perform encryption/decryption of a message. When the communication takes place within the one-time-pad app itself, messages may be automatically encrypted before being sent from a device and automatically decrypted when received by the device.

The subject technology addresses a technical problem tied to computer technology and arising in the realm of secure communications, namely the technical problem of providing secure and non-tampered transmission of messages between devices using one-time-pad encryption. The subject technology solves this technical problem by generating a password simultaneously on two or more devices when the users of the devices are in proximity to each other and seeding a random number generator (RNG) to produce an identical block of data on each device.

The subject technology provides a solution necessarily rooted in computer technology as it relates to the proximity pairing of two or more mobile electronic devices, automatic generation of encrypted communications between the processors of the mobile devices, and persisting the encryption for continuously secure communications. For example, the subject technology provides that the data from a one-time-pad is persisted alongside generated random data by using the received image as a seed to a cryptographically secure random number generator, storing the data to the device's SD card, hard drive, or other persistent media, and installing a device driver, Access Control List, or other system permission to prevent other processes or users from accessing the stored data. Thus, the subject technology drastically reduces or eliminates network bandwidth requirements for providing an encryption key between devices, and vastly improves the security parameters of the processor/communications interface of the computerized devices.

As an example, two users may intend to transmit a message and want to ensure secure and non-tampered transmission of the message. Sending a password could be intercepted, mailing a letter with a code could be opened and re-sealed, whispering a password could mean that the password was pre-chosen and shared with others, and exchanging a hard drive containing the password risks that the hard drive could have been duplicated before the exchange.

To overcome these potential risks, it is useful to generate a password simultaneously on both devices when users are together. Each device starts by showing codes on screen while the other device uses its camera or NFC to read the code from the other device's screen. The device roles swap and the previous receiver is now the sender.

Once both sides have received the other's codes, the combined data is stored and used to seed a random number generator. This random number generator produces a large block of data on the device which will be identical for each user device.

Further communication can now occur between devices of users in an encrypted manner, either within the app or within other apps which have implemented this invention as a plugin through a Software Development Kit (SDK). Then, for received messages at each device, the appropriate portion of the key is identified from the random generated data and decrypted.

Example System Architecture

Architecturally, the subject technology can be deployed on any device. For example, it may be preferable to operate on a server device that may be paired with multiple client devices. As another example, the subject technology may be operated on any number of individual client devices, allowing the client devices to securely communicate with each other.

FIG. 1 illustrates an example architecture 100 for providing secure one-time-pad encryption between devices by leveraging close-proximity inter-device communication. The architecture 100 includes devices 110 connected via proximity inter-device communication 150, such as via near field communication (NFC) or quick response (QR) codes.

The devices 110 can be, for example, desktop computers, mobile computers, tablet computers (e.g., including e-book readers), mobile devices (e.g., a smartphone or personal digital assistant), set top boxes (e.g., for a television), video game consoles, or any other devices having appropriate processor, memory, and communications capabilities for transmitting data to and from other devices. The devices 110 pair together through the proximity inter-device communication 150 to generate a one-time pad simultaneously on each of the paired devices 110.

Example System for One-Time Pad Encryption

Figure 2:
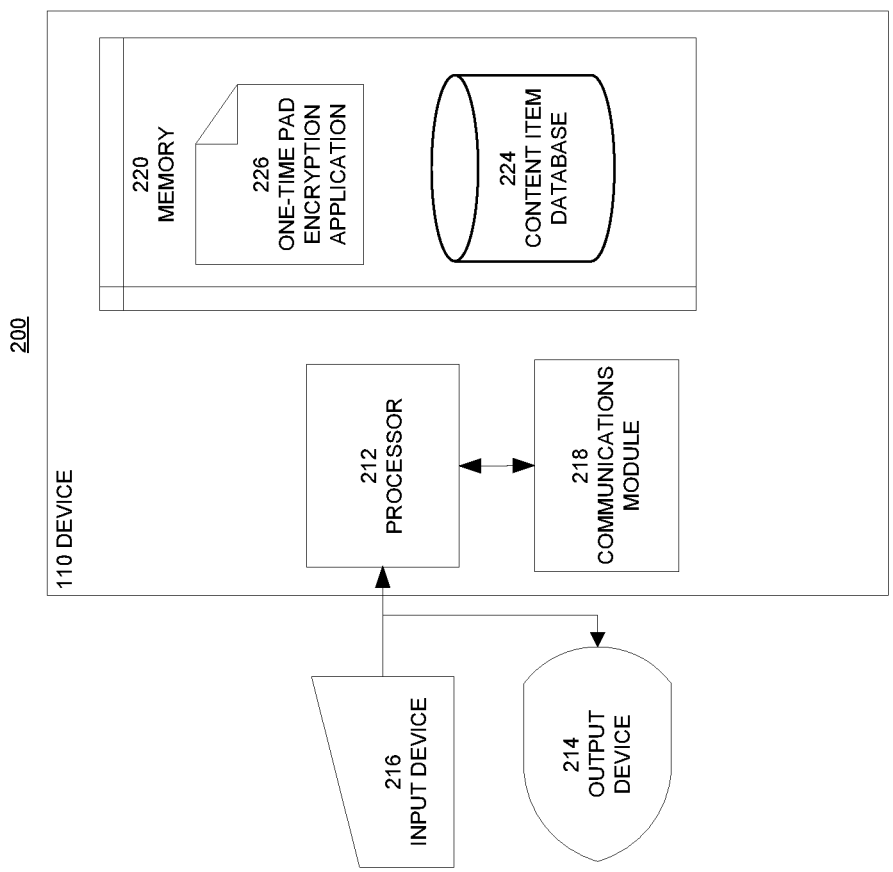
FIG. 2 is a block diagram illustrating an example device from the architecture of FIG. 1 according to certain aspects of the disclosure.

FIG. 2 is a block diagram 200 illustrating an example device 110 in the architecture 100 of FIG. 1 according to certain aspects of the disclosure.

The device 110 is connected over proximity inter-device communication 150 via communications module 218. The communications module 218 is configured to interface with another device 110 through the proximity inter-device communication 150 to send and receive information, such as encryption information, data, requests and responses. The communications module 218 can be, for example, a cellular interface, a WIFI interface, a BlueTooth interface, an NFC interface or a camera. The device 110 also includes an input device 216, such as a stylus, touchscreen, keyboard, or mouse, and an output device 214, such as a display. The device 110 further includes a processor 212 and a memory 220. The memory 220 includes a content item database 224 and a one-time pad encryption application 226. The content item database 224 may include, for example, a URL, a web page, a document such as a text document, a spreadsheet, a media file (e.g., audio, image, video, or any combination thereof), or any other data object/body of data configured to be interacted with by a user of the device 110 and securely communicated to another device 110.

The processor 212 of the device 110 is configured to execute instructions, such as instructions physically coded into the processor 212 instructions received from software in memory 220, or a combination of both. For example, the processor 212 of the device 110 may execute instructions to select and run the one-time pad encryption application 226, to pair with another device 110 through the proximity inter-device communication 150 to generate a one-time pad, to generate random data, to persist the one-time pad alongside the generated random data, to encrypt data for transmission to the other paired device 110, and to decrypt data received from the other paired device for display on the device 110.

Specifically, the processor 212 of the device 110 executes instructions causing the processor 212 to establish a secure communication path with another device in order to securely transmit/receive data to/from the other device. For example, a one-time pad may be generated on two devices 110 by generating images which contain random data, displaying the generated image on the first device and recording the displayed image on the second device. The image may be in the form of an extended QR code. Because the QR code does not need to be physically printed, it can offer deeper dimensions and a greater quantity of data. For example, the QR code may be animated, with the second device recording repeating images of multiple frames. As another example, the QR code may contain color to introduce an additional dimension of complexity and data depth, as the additional dimension of color within a QR code provides for packing more data into a QR code than conventional black-and-white or color-ignored printed codes.

The processor 212 of the device 110 may also execute instructions causing the processor 212 to generate image data by a cryptographically secure random number generator. Thus, rather than physically exchanging previously determined data, this generated image ensures that no compromise could have occurred, even if the users themselves are compromised.

The generated data shared between devices 110 may be at least 1,024 bytes, and preferably is much larger. Here, each frame of the code needs to be shown on-screen for only a fraction of a second for data acquisition to occur, then the next frame will be displayed. This process continues until the entire code is transmitted. Thus, though transmission/ acquisition could fail for some frames of the code, the code may be continually displayed, rotating between frames, until the receiving device correctly acquires all of the frames.

As an example, a first device 110 may generate a code that is scanned by the second device 110 (e.g., by the device's camera). Correspondingly, the second device 110 generates a code which is scanned by the first device 110. Here, the codes may be intermixed (e.g., using an XOR function or other scrambling function), resulting in a single identical code residing on each device 110, where the code is produced by input from each device 110. More than two devices 110 may be grouped in a similar process, with each device 110 scanning each of the other devices 110 so that all of the devices 110 end up with a single identical code residing on each device 110.

The processor 212 of the device 110 may also execute instructions causing the processor 212 to persist the data from the one-time pad alongside generated random data by using the received image as a seed to a cryptographically secure random number generator, storing the data to the device 110, and installing a system permission to prevent other processes or users from accessing the stored data. For example, the generated data tying a pair of devices 110 may be at least 100 megabytes in size. Thus, data may be generated using a cryptographically secure algorithm that uses the approximate time (e.g., to account for slight discrepancies in device time) and approximate global positioning system (GPS) coordinates as a parameter to ensure that generated data will differ if the source image is stolen and used as a seed elsewhere.

The processor 212 of the device 110 may also execute instructions causing the processor 212 to use the persisted one-time-pad to encrypt/decrypt data by referencing positional markers and rolling checksums within the one-time-pad and modifying the persisted data as it is used. Thus, the subject technology may prevent the entire one-time pad from being used in a single transaction. This may require an encrypted message of greater size than the one-time pad itself, which may be impractical as data is naturally broken into chunks. However, having such a safeguard in place may prevent any sort of leak from over-sized queries. Also, for example, the positional markers may iterate across the stored data based on a prime number to ensure that as data is read, it does not fall back to the same starting position.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

FIGS. 3-6 illustrate example processes 300, 600, data structure 400 and message structure 500 for providing one-time pad encryption using the example device 110 of FIG. 2. While FIGS. 3-6 are described with reference to FIG. 2, it should be noted that the process steps and structures of FIGS. 3-6 may be performed or used by other systems.

Figure 3:
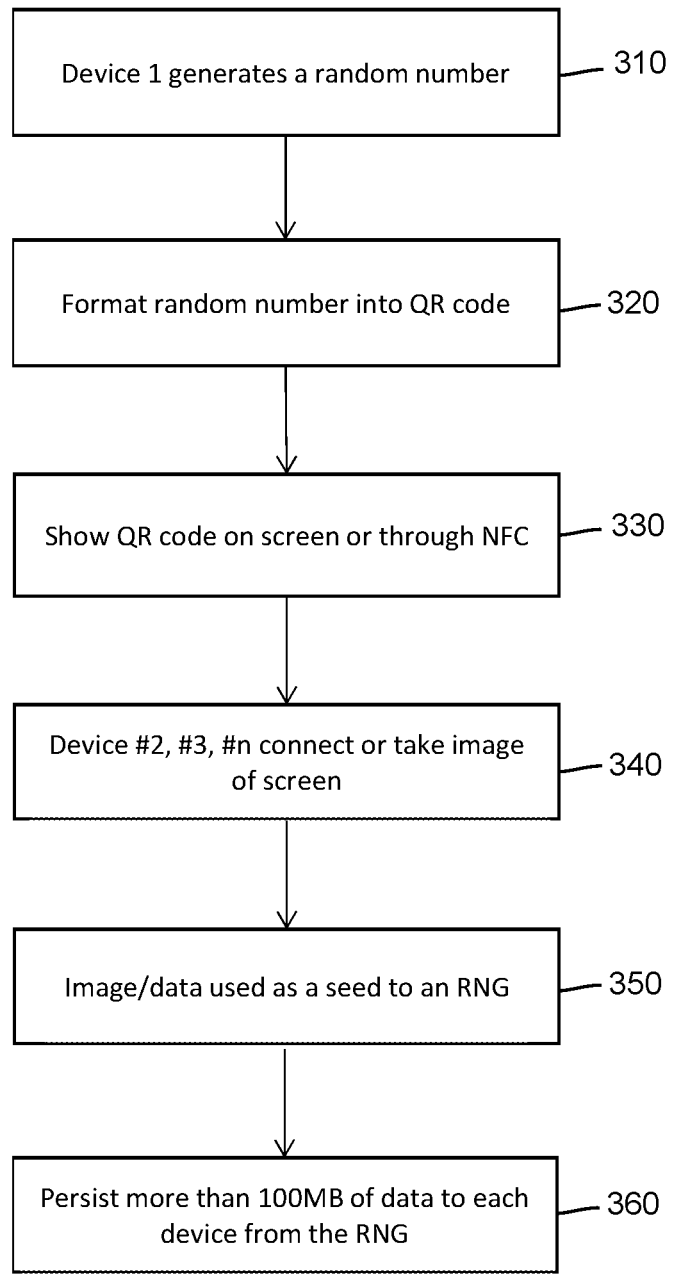
FIG. 3 is an example process associated with the disclosure of FIG. 2.

As shown in FIG. 3, a process 300 pairs or groups two or more devices together for secure communications between the devices. The process 300 begins in step 310 when a first device (e.g., Device 1) of multiple devices generates a random number. In step 320, the random number is generated into a QR code. The generated QR code is then provided to the other devices (e.g., Devices 2, 3, . . . N) in step 330. For example, the QR code generated by Device 1 may be displayed on the screen of Device 1 or transmitted through NFC. In step 340, each of the other Devices 2, 3, . . . N connect to Device 1 through NFC or capture an image of the QR code displayed on the screen of Device 1. The image/data is then used as a seed to a RNG in step 350. In step 360, the RNG persists a large block of data (e.g., more than 100 MB) to each of Devices 1, 2, 3, . . . N.

The process 300 provides secure transmission of data between the paired/grouped devices and further communication may now occur between users of the paired/grouped devices in an encrypted manner. For example, as discussed above, the communications may occur either within the one-time pad encryption application, or within other applications that have implemented the subject technology as a plugin through a SDK. Thus, as messages are received by a securely grouped device, the appropriate portion of the key may be identified from the random generated data and decrypted.

Figure 4:
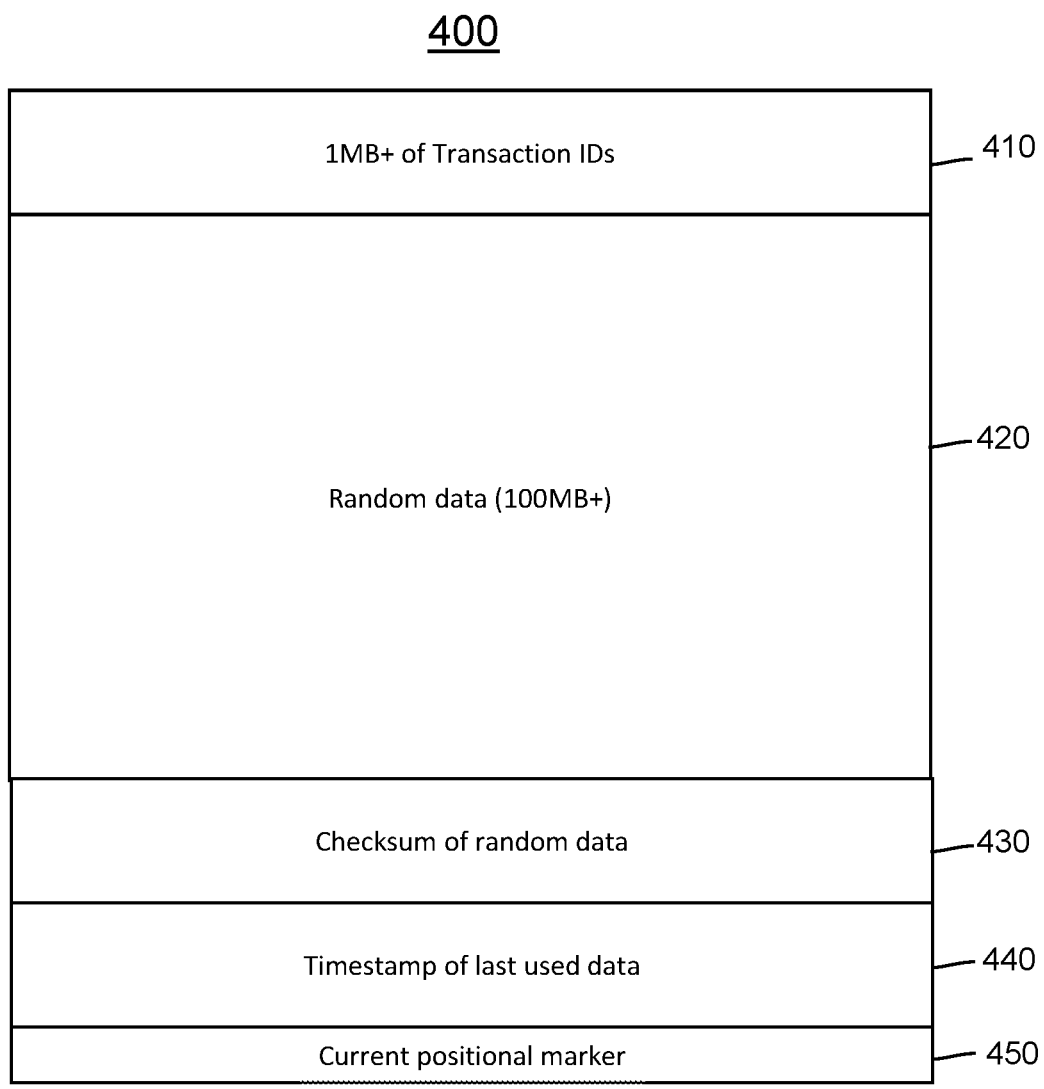
FIG. 4 is an example data structure associated with the disclosure of FIG. 2.

FIG. 4 illustrates an example data structure 400 for a one-time pad encryption application. In layer 410, there is a large block (e.g., 1 MB or larger) of transaction identifications (IDs). A large block of random data (e.g., 100 MB or larger) is in layer 420. In layer 430, there is a checksum of the random data, whereas there is a timestamp of last used data in layer 440. Layer 450 is a current positional marker.

FIG. 5 illustrates an example message structure 500 for a one-time pad encryption application. In layer 510, there is a message structure header. A sender user ID is in layer 520. In layers 530 and 540, there is a RNG block start offset and a RNG block end offset, respectively. Layer 550 includes a message length. The message body is in layer 560.

In FIG. 6, process 600 provides an example decryption process. In step 610, a message is received by a paired/grouped device. In step 620, the expected offset in the stored random data is read from the received message. The message is decrypted based on the stored random key data in step 630.

An example will now be described using the example processes and structures 300-600 of FIGS. 3-6, a pair of devices 110 that are smartphones, each having an output device 214 that is a flat panel display, an input device 216 that is a touch screen interface, a content item database 224 that stores content that can be displayed on the smartphone, a communications module 218 that provides for communication with the other smartphone device 110 through a proximity inter-device communication 150, and a one-time pad encryption application 226.

The process begins when the one-time pad encryption application 226 on a first device 110 generates a random number in step 310 and formats the generated random number into a QR code in step 320. In step 330, the one-time pad encryption application 226 then provides the QR code on the display of the first device 110 or transmits the QR code through NFC to a second device 110. The second device 110 then captures an image of the QR code on the display of the first device 110 (e.g., take a picture of the QR code with the camera of the second device 110) or receives the QR code via an NFC connection with the first device 110 in step 340. In step 350, the one-time pad encryption application 226 uses the captured/received QR image or data as a seed for a RNG. The one-time pad encryption application 226 then persists a large block of data (e.g., over 100 MB) to each device from the RNG in step 360.

A message to be sent from the first device 110 is then encrypted by the one-time pad encryption application 226 according to the data structure 400 and the message structure 500. The encrypted message is then sent from the first device 110 to the second device 110 by any desired transmission (e.g., text message, email, Bluetooth transmission, etc.). The second device 110 receives the encrypted message in step 610. In steps 620 and 630, the one-time pad encryption application 226 reads the expected offset in the stored random data from the received message and decrypts the message based on the stored random data key. Thus, the user of the second device 110 may read or view the decrypted message and respond with a return message back to the user of the first device 110 by the same process.

The entire encryption/decryption may take place in the background without any involvement from the users other than generating and viewing the secure messages being transmitted back and forth, except for when the pairing of the devices 110 is accomplished by each user taking a picture of the QR code on the other user's device display. However, after the initial pairing, there is no need to be physically in the same location and messages can be broadcast through any normal unencrypted channel. For example, because of the inherent security and lack of a need to exchange a password after pairing, messages may be broadcast into a blockchain (e.g., bitcoin), thus leaving the encrypted messages visible. In this case, the recipient will read the appropriate message from the blockchain and only the recipient's paired device 110 will be able to decode it.

Once devices are paired/grouped using the one-time pad encryption application 226, the pairing/grouping may last indefinitely, thus allowing continuous secured communications between the paired/grouped devices 110. The one-time pad encryption application 226 may also include a timeout feature, thus putting a limit on the time or amount of data to be transmitted over the secure pairing/grouping of the devices 110. Once such a limit is reached, the pairing/grouping process would have to be repeated as described above in order for the devices 110 to resume secure communications with each other.

As another example, the one-time pad encryption application 226 may be implemented on a bank device 110 (e.g., a server) and multiple client devices 110 (e.g., fob, hardware key) via a pairing procedure. Here, the pairing procedure may be performed when a new customer signs up or logs into the bank for the first time, or if the user's account has expired and a re-pairing is needed. Thus, the bank has the server-side one-time pad encryption application 226 installed that allows bank personnel to generate a paired key (e.g., the parent) in-house for this given user. The bank personnel then send (e.g., mail) or give (e.g., by hand) the new device (e.g., the child) to the end-user.

In particular, when the device is being prepared, the bank may pair the child with the parent server at a workstation terminal where the codes generated on the device may be read and exchanged. For example, the bank employee may connect the new child device to their workstation or use a hand-held device to connect to it (e.g., a smartphone owned by the bank with a version of the one-time pad encryption application 226 specifically intended to pair and store the generated codes on the bank's servers. Once paired, the child device will be delivered to the user, either physically handed to the user or packaged and mailed to the user in tamper-evident packaging for an added layer of security.

Continuing with the bank example, depending on the type of child device (e.g., fob) that is used, the user could use the fob as a standalone device (e.g., a discrete device) or the user could plug the fob into a computer or smartphone (e.g., USB). The fob may have discrete internet connectivity or use the user's data plan or Wifi connection. When the user chooses to log into the bank, the user may press a button on the fob, causing it to send a packet of data to the bank server, thus leveraging the secured encryption the bank server and fob have from the original pairing. The bank server may then respond with an acceptance code that is shown on a display screen of the fob and entered in by the user as a form of two factor authentication.

This server based approach of the subject technology differs from conventional approaches like secure ID tokens that are generally passive in nature. For example, secure ID tokens and similar technologies merely have a pre-set random number generator that generates the same number on-screen as what the bank is expecting. Thus, if the seed from the token is stolen or if enough random numbers are observed to where the pattern becomes predictable, the added layer of security is nullified. By contrast, the subject technology takes a more active approach where data is exchanged by the user's device with the bank's server through a previously established secure connection.

Hardware Overview

Figure 7:
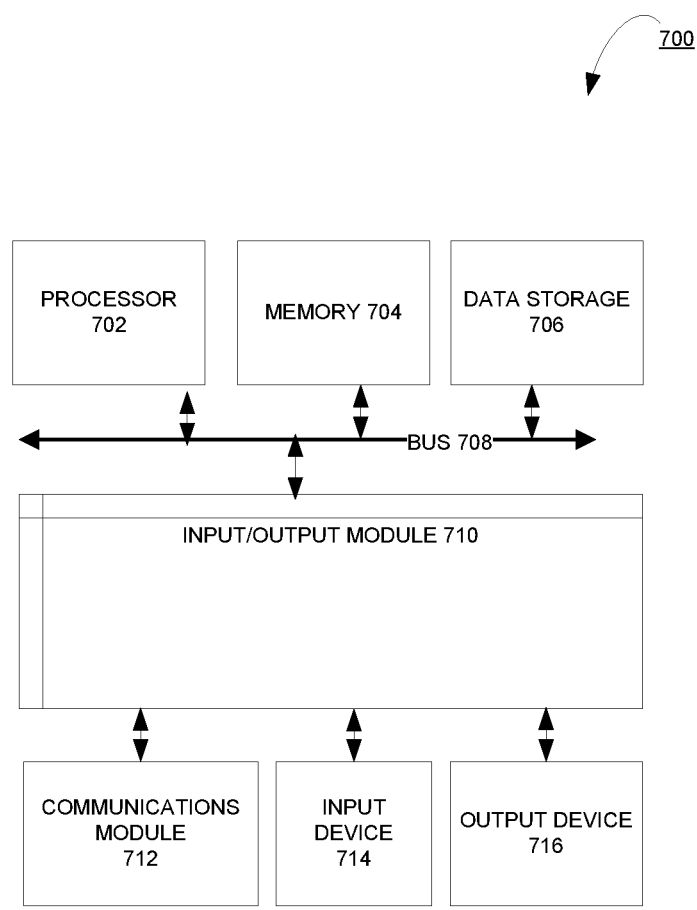
FIG. 7 is a block diagram illustrating an example computer system with which the device of FIG. 2 can be implemented.

FIG. 7 is a block diagram illustrating an example computer system 700 with which the device 110 of FIG. 2 can be implemented. In certain aspects, the computer system 700 may be implemented using hardware or a combination of software and hardware, either in a dedicated server or integrated into another entity or distributed across multiple entities.

Computer system 700 (e.g., device 110) includes a bus 708 or other communication mechanism for communicating information, and a processor 702 (e.g., processor 212 and 236) coupled with bus 708 for processing information. According to one aspect, the computer system 700 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 700 may be implemented with one or more processors 702. Processor 702 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry. Expansion memory may also be provided and connected to computer system 700 through input/output module 710, which may include, for example, a SIMM (Single In Line Memory Module) card interface. Such expansion memory may provide extra storage space for computer system 700 or may also store applications or other information for computer system 700. Specifically, expansion memory may include instructions to carry out or supplement the processes described above and may include secure information also. Thus, for example, expansion memory may be provided as a security module for computer system 700 and may be programmed with instructions that permit secure use of computer system 700. In addition, secure applications may be provided via the SIMM cards, along with additional information, such as placing identifying information on the SIMM card in a non-hackable manner.

The instructions may be stored in the memory 704 and implemented in one or more computer program products, i.e., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototypebased languages, off-side rule languages, procedural languages, reflective languages, rule-based languages, scripting languages, stack-based languages, synchronous languages, syntax handling languages, visual languages, wirth languages, embeddable languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Example input/output modules 710 include data ports such as USB ports. In addition, input/output module 510 may be provided in communication with processor 702, so as to enable near area communication of computer system 700 with other devices. The input/output module 710 may provide, for example, for wired communication in some implementations, or for wireless communication in other implementations, and multiple interfaces may also be used. The input/output module 710 is configured to connect to a communications module 712. Example communications modules 712 (e.g., communications module 218) include networking interface cards, such as Ethernet cards and modems.

The components of the system can be interconnected for pairing by any form or medium of proximity inter-device communication 150 (e.g., camera, NFC). The paired devices may then be interconnected over any communication network, which can include, for example, any one or more of a PAN, a LAN, a CAN, a MAN, a WAN, a BBN, the Internet, and the like. Further, the communication network can include, but is not limited to, for example, any one or more of the following network topologies, including a bus network, a star network, a ring network, a mesh network, a star-bus network, tree or hierarchical network, or the like.

For example, in certain aspects, communications module 712 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 712 sends and receives electrical, electromagnetic or optical signals that carry digital data streams representing various types of information. The network link typically provides data communication through one or more networks to other data devices. For example, the network link of the communications module 712 may provide a connection through local network to a host computer or to data equipment operated by an Internet Service Provider (ISP). The ISP in turn provides data communication services through the world wide packet data communication network now commonly referred to as the Internet. The local network and Internet both use electrical, electromagnetic or optical signals that carry digital data streams. The signals through the various networks and the signals on the network link and through communications module 712, which carry the digital data to and from computer system 700, are example forms of transmission media.

Computer system 700 can send messages and receive data, including program code, through the network(s), the network link and communications module 712. In the Internet example, a server might transmit a requested code for an application program through Internet, the ISP, the local network and communications module 712. The received code may be executed by processor 702 as it is received, and/or stored in data storage 706 for later execution.

In certain aspects, the input/output module 710 is configured to connect to a plurality of devices, such as an input device 714 (e.g., input device 216) and/or an output device 716 (e.g., output device 214). Example input devices 714 include a stylus, a finger, a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 716 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 716 may comprise appropriate circuitry for driving the output device 716 to present graphical and other information to a user.

According to one aspect of the present disclosure, the device 110 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 702 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 708. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for providing secure communications between devices, the method comprising:
   generating, by a first device, a first random number;
   formatting, by the first device, the first random number into a first device code;
   providing, by the first device, the first device code for communication to a second device;
   receiving, by the second device, the first device code from the first device via a proximity inter-device communication;
   generating, by the second device, a second random number;
   formatting, by the second device, the second random number into a second device code;
   providing, by the second device, the second device code for communication to the first device;
   receiving, by the first device, the second device code from the second device via the proximity inter-device communication;
   generating an identical one-time pad code on each of the first and second devices;
   storing the one-time pad code on each of the first and second devices wherein the first and second devices are paired via the one-time pad code;
   independently generating, by the first and second devices, an identical block of random data based on the one-time pad code;
   encrypting, by the one-time pad code and block of random data stored on one of the first and second devices, content data to be transmitted to the other of the first and second devices; and
   decrypting, by the one-time pad code and block of random data stored on one of the first and second devices, content data received from the other of the first and second devices,
     wherein the encrypting and decrypting are based on positional markers and rolling checksums within the block of random data.

2. The method of claim 1, wherein the proximity inter-device communication comprises using a camera of the first device to capture an image of the second device code from a display of the second device and using a camera of the second device to capture an image of the first device code from a display on the first device.

3. The method of claim 1, wherein the proximity inter-device communication comprises near field communication.

4. The method of claim 1, wherein the one-time pad code is generated by intermixing the first and second device codes using a scrambling function.

5. The method of claim 1, further comprising:
   generating, by a third device, a third device code;
   transmitting and receiving by each of the first, second and third devices, via the proximity inter-device communication, so that each of the first, second and third devices have all three device codes; and
   generating the one-time pad code on each of the first, second and third devices, wherein all three devices are grouped via the one-time pad code.

6. The method of claim 1, further comprising:
generating the identical block of random data by a cryptographically secure random number generator.

7. The method of claim 6, wherein the block of random data is at least 100 megabytes in size.

8. The method of claim 6, wherein the block of random data is generated using an approximate time of day when the block of data is being generated.

9. The method of claim 6, wherein the block of random data is generated using approximate global positioning system coordinates where the block of data is being generated.

10. The method of claim 6, further comprising:
storing the one-time pad code alongside the block of random data;
storing the one-time pad code and the block of random data in a memory of each of the first and second devices; and
installing a system permission preventing other processes or users from accessing the stored one-time pad code and block of random data.

11. The method of claim 10, further comprising:
encrypting, by the block of random data stored on one of the first and second devices, content data to be transmitted to the other of the first and second devices; and
decrypting, by the block of random data stored on one of the first and second devices, content data received from the other of the first and second devices.

12. The method of claim 11, further comprising:
modifying the stored block of random data as it is used.

13. The method of claim 1, wherein approximate global positioning system coordinates and approximate time of day for each of the first and second devices are inputs for the one-time pad code generation by each respective device.

14. A system for providing secure communications between more than two devices, the system comprising:
at least one memory; and
at least one processor configured to execute instructions stored on the at least one memory which, when executed, cause the processor, for each of the more than two devices, to:
generate a unique device code associated with that device;
transmit, via proximity inter-device communication, the unique device code to each of the other of the more than two devices;
receive, via the proximity inter-device communication, the other unique device codes from each of the other of the more than two devices;
verify the unique device codes by comparing an approximate time of day from each of the more than two devices;
generate, independently on each of the more than two devices using a scrambler, an identical one-time pad code by intermixing all of the unique device codes of the more than two devices and the approximate time of day; and
store the identical one-time pad code on each of the more than two devices to facilitate encrypted communications between the more than two devices;
generate, by a cryptographically secure random number generator, a block of random data based on the one-time pad code;
installing a system permission preventing other processes or users from accessing the stored one-time pad code and block of random data;
encrypting, by the one-time pad code and block of random data stored on one of the more than two devices, content data to be transmitted to another of the more than two devices; and
decrypting, by the one-time pad code and block of random data stored on one of the more than two devices, content data received from the other of the more than two devices.

15. The system of claim 14, further comprising instructions that cause the processor to:
generate, an approximate time of day when the block of random data is being generated, and approximate global positioning system coordinates where the block of random data is being generated.

16. The system of claim 14, wherein the encryption and decryption are based on positional markers and rolling checksums within the block of random data.

17. A non-transitory machine-readable storage medium comprising machine-readable instructions for causing a processor to execute a method for providing secure communication using a one-time pad, the method comprising:
generating, by a computerized device, a random number;
formatting, by the computerized device, the random number into an animated quick response (QR) code comprising a plurality of frames and unique to the computerized device;
receiving, by the computerized device via a proximity inter-device communication, other animated QR codes uniquely associated with one or more other computerized devices;
generating a one-time pad code by intermixing all of the random numbers represented by a plurality of frames of animated QR codes;
generating, by a cryptographically secure random number generator, a block of random data based on the one-time pad code;
storing the one-time pad code and the block of random data on the computerized device;
encrypting messages before transmission to any of the other computerized devices using the stored one-time pad code and block of random data;
decrypting messages received from any of the other computerized devices using the stored one-time pad code and block of random data,
wherein the one-time pad code and the block of random data are identically generated on the computerized device and the one or more other computerized devices;
storing the one-time pad code and the block of random data in a memory of each of the computerized devices;
installing a system permission preventing other processes or users from accessing the stored one-time pad code and block of random data;
encrypting, by the one-time pad code and block of random data stored on one of the computerized devices, content data to be transmitted to the other of the computerized devices; and
decrypting, by the one-time pad code and block of random data stored on one of the computerized devices, content data received from the other of the computerized devices,
wherein the encrypting and decrypting are based on positional markers and rolling checksums within the block of random data.

18. The non-transitory machine-readable storage medium of claim 17, further comprising:
   encrypting and decrypting the messages based on the positional markers and rolling checksums within the block of random data; and
   modifying the stored block of random data as it is used.

* * * * *